United States Patent [19]
Abolins et al.

[11] 3,945,687
[45] Mar. 23, 1976

[54] STRUCTURAL ASSEMBLY FOR MOUNTING COMPRESSED AIR BRAKE ANTI-SKID EQUIPMENT ON VEHICLE

[75] Inventors: Andrew Abolins, Langhorne; Joseph A. Bertsch, Reading, both of Pa.

[73] Assignee: Strick Corporation, Fairless Hills, Pa.

[22] Filed: May 22, 1975

[21] Appl. No.: 580,028

[52] U.S. Cl......... 303/21 R; 188/205 R; 280/150 R; 296/28 F
[51] Int. Cl.².......................................... B60T 17/00
[58] Field of Search............. 303/21, 7; 188/181, 3, 188/206, 205; 280/150 R, 5 R, 5 F; 296/28 F

[56] References Cited
UNITED STATES PATENTS

| | | | |
|---|---|---|---|
| 2,336,342 | 12/1943 | Brewer, Jr. | 303/7 |
| 2,434,050 | 1/1948 | Price | 303/7 |
| 2,673,622 | 3/1954 | Coombes et al. | 188/205 R X |
| 3,122,220 | 2/1964 | Hoffstrom | 188/205 R X |
| 3,266,675 | 8/1966 | Willis | 280/150 R X |
| 3,521,907 | 7/1970 | Pour | 303/7 X |
| 3,620,577 | 11/1971 | Neisch et al. | 303/7 X |
| 3,638,748 | 2/1972 | Tixier | 296/28 F X |
| 3,759,540 | 9/1973 | Olson | 296/28 F X |
| 3,804,471 | 4/1974 | Fish | 303/7 |
| 3,878,925 | 4/1975 | Ignatoweicz | 188/206 R |

Primary Examiner—Trygve M. Blix
Assistant Examiner—Douglas C. Butler
Attorney, Agent, or Firm—Connolly and Hutz

[57] ABSTRACT

Pneumatic and electrical components of an anti-skid braking system are assembled upon and within an elongated housing frame, which is mounted in a free space under the vehicle chassis. The air tanks are strapped to the top of the frame in a triangular array in indentations in ridged ends. The pneumatic control elements are disposed in a staggered array within the housing. An indented cover panel, which receives the electrical computer components is secured to the bottom of the housing. The cover panel is permanently or removably attached to the bottom of the housing.

12 Claims, 8 Drawing Figures

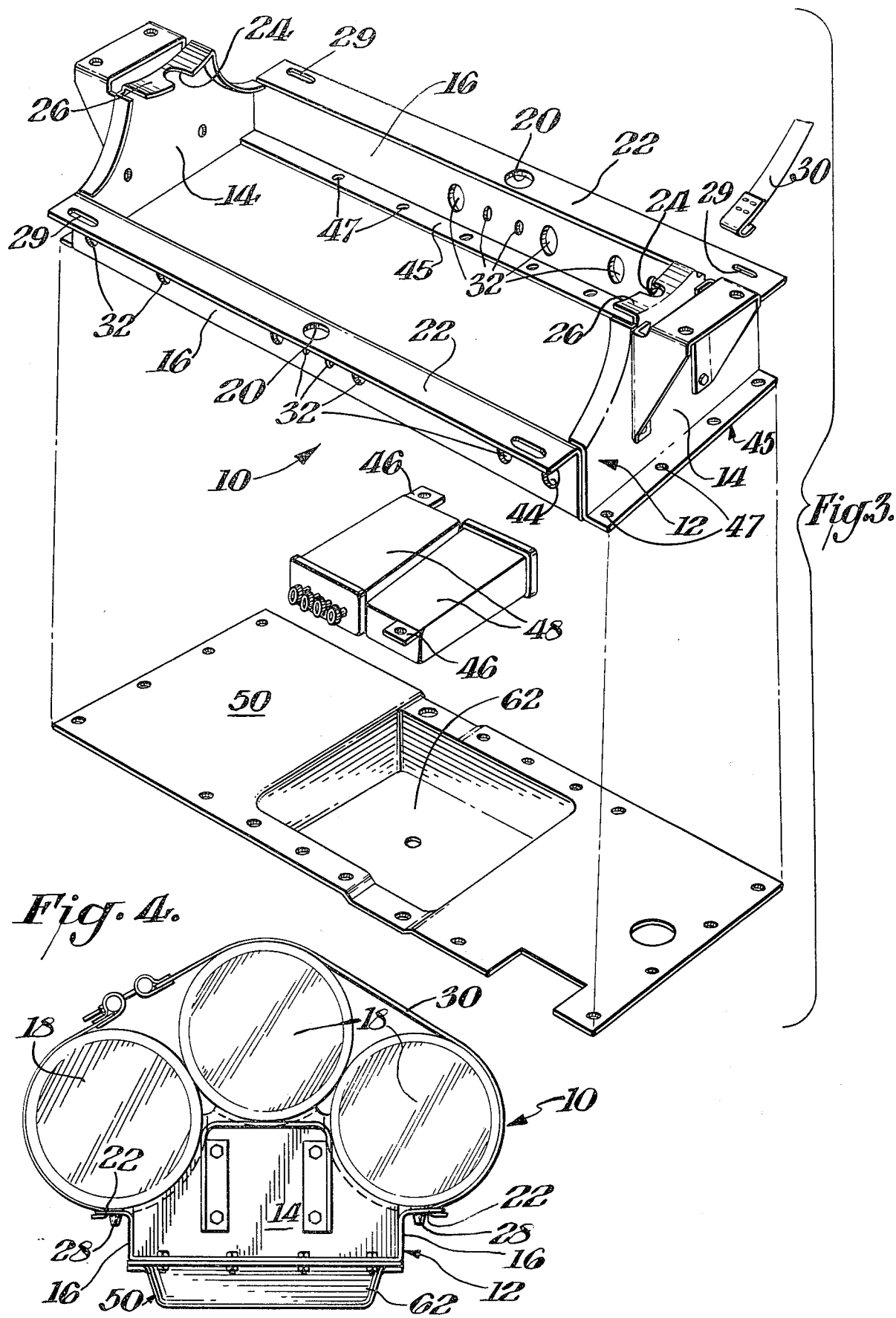

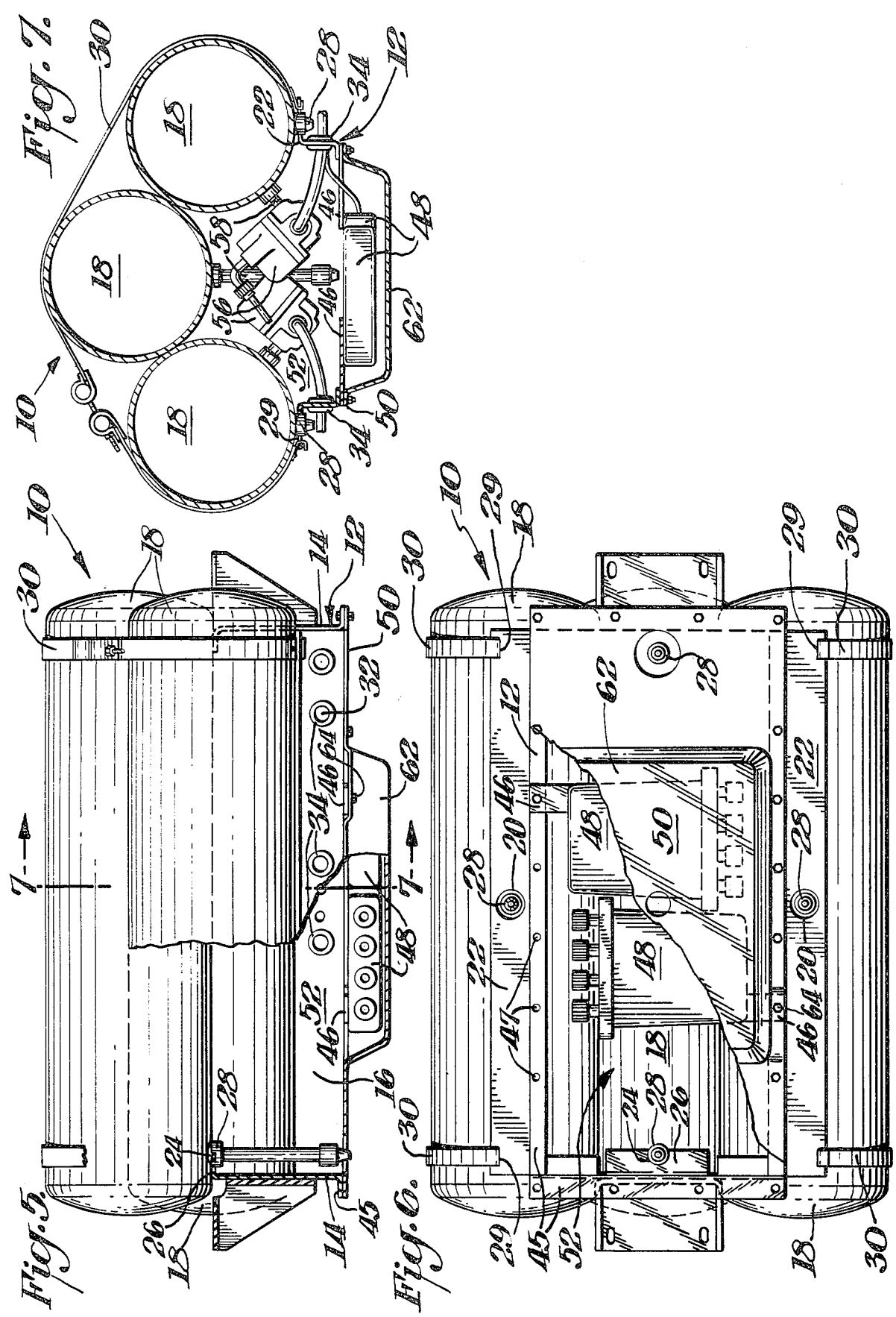

STRUCTURAL ASSEMBLY FOR MOUNTING COMPRESSED AIR BRAKE ANTI-SKID EQUIPMENT ON VEHICLE

BACKGROUND OF THE INVENTION

The systems developed by the air brake equipment industry to meet the Department of Transportation skid control requirements for semi-trailers and container chassis (FMVSS-121) consist basically of a number of pneumatic, electric and electropneumatic components.

A few of these, such as the (electric) sensors and the (pneumatic) spring brake chambers are sub-assembled with the axles; the other components must be mounted on the sprung part of the vehicle and interconnected by tubing, hoses and wiring to form the required pneumatic and electric system circuitry. The common practice is to mount the other components individually onto structural members of the trailer subframe respectively chassis. In this "scattered" type, installation, the actual location and positioning of the components is to a large extent controlled by the configuration and location of said structural members, which vary on different types of vehicles and in most cases, cannot be rearranged to suit the optimum requirements for mounting the skid control components.

Typical examples of the pneumatic components are air reservoirs, amplifying relay valves, check valves and pressure protection valves; typical electric components are computers (also known as "logic modules"), junction and fuse (or circuit breaker) boxes; typical electro-pneumatic components are the control valves. A considerable number of these components is required, particularly in a tandem axle vehicle. Installing them in place and making all air and electrical connections requires quite a number of additional man hours on the main assembly line at or after the finishing station. Some of the components, particularly the computers, are very compact and relatively expensive devices. They are, therefore, attractive objects for thieves.

Since they are mounted in an exposed position underneath the vehicle, these components and the air and electrical lines connecting them are splashed by water and mud and struck by road salt and road debris.

An object of this invention is to preassemble ("package") all skid control system components (other than those mounted on the axles) into a single unit which:

1. provides mechnical protection for system components from sub-assembly through installation-upon-vehicle stages at the manufacturing plant;
2. provides anti-theft protection;
3. reduces "line time" (labor required to install skid control system on trailers and/or chassis);
4. provides mechanical and anti-corrosion protection for system components (including air piping and electrical wiring) in road operation;
5. discourages theft of valuable system components in road operation;
6. makes it possible to remove the complete skid control system and replace it by a spare unit in minimum time without special skills or tools; and
7. achieves these aims in the most economical way, without changes in the existing design of trailer and chassis frames and suspension components, or compromising the system performance while permitting trouble shooting and repair of the system without removing it as a unit from the vehicle.

SUMMARY

The control equipment for an anti-skid braking system and the compressed air tanks are assembled together upon and within an open frame which is mounted on the vehicle. The air tanks are secured over one rim of the housing, preferably by strapping, with attached pneumatic control valves and tubing disposed within the housing in a staggered array. A triangular disposition of the air tanks is particularly effectively provided by arcuate indentations in ridged ends of the housing to which brackets are attached for mounting under the vehicle. A panel covers the outer rim of the housing and may have an indented compartment for receiving electrical computer components. The panel may be permanently or removably attached depending upon whether it is most important to prevent theft of the computer components or to facilitate removal of the components for maintenance or replacement.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 3 is an exploded three-dimensional view of the housing frame and lower components of the embodiment shown in FIGS. 1 and 2;

FIG. 4 is an end view of the embodiment shown in FIGS. 1-3;

FIG. 5 is a side view of the embodiment shown in FIGS. 1-4 with one of the air tanks and a side of the housing partially broken away;

FIG 6 is a bottom plan view of the embodiment shown in FIGS. 1-5 with a portion of the bottom cover broken away;

FIG. 7 is a cross-sectional view taken through FIG. 5 along the line 7—7; and

DESCRIPTION OF THE PREFERRED EMBODIMENT

Figure 1:
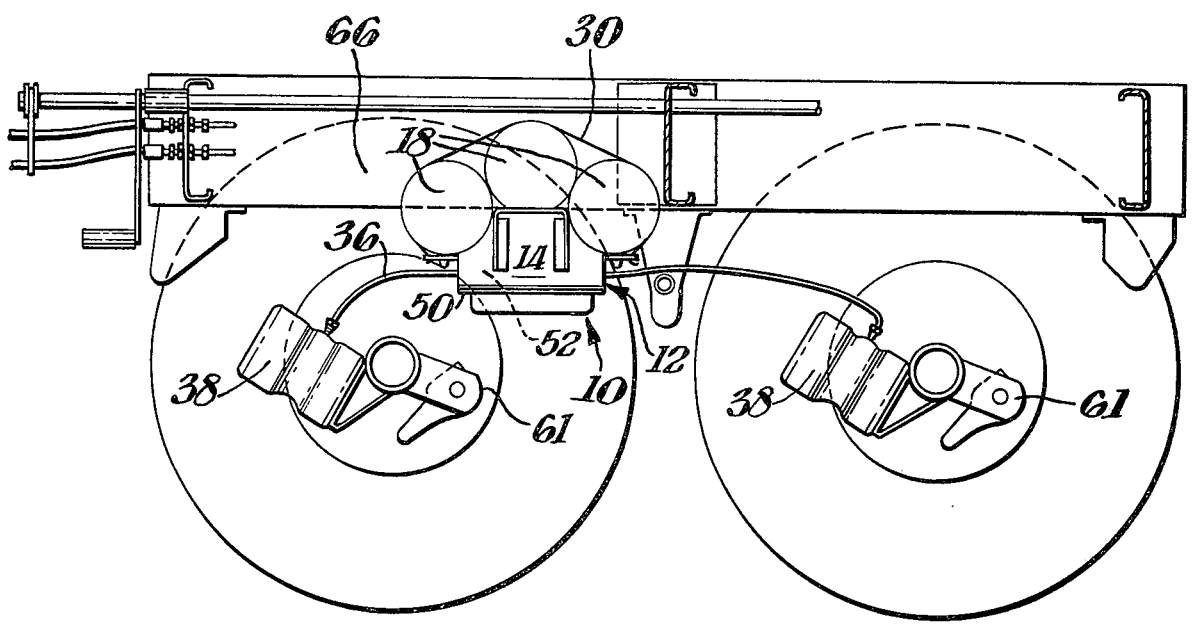
FIG. 1 is an end view of one embodiment of this invention mounted under the chassis of a vehicle.

In FIGS. 1-8 is shown assembly or package 10 including elongated housing frame 12, which has the following functions:

1. Serves as chassis for mounting all electric, pneumatic and electro-pneumatic components plus the necessary piping and wiring;
2. Has attachment provisions for being bolted onto the trailer, respectively, container chassis;
3. Forms protective enclosure around all damage prone parts.

Housing frame 12 has short ends 14 and long sides 16 providing support and positive axial and angular positioning for the 3 air reservoirs or tanks 18. Air reservoirs 18, being made of steel plate, are strong, mechanical damage and corrosion-resisting parts, that do not require any protection; as such they themselves are used to form the top closure and protective wall of the package.

The reservoir positioning is achieved by providing holes 20 in the top flanges 22 of the Zee cross-sectioned sides 16 and slots 24 in the top flanges 26 of the end plates 14 of the housing frame 12. These holes 20 and slots 24 engage the drain ferrules 28 of the air reservoirs. The reservoirs 18 are clamped onto the housing by two metal straps 30, a standard hardware item, which hook into four slots 29 located in the top flanges 22 of the sides 16.

The sides 16, also have a number of appropriately positioned and sized holes 32 which when lined with rubber grommets 34, provide entry ports for the external pneumatic and electric connection lines 36 (air hoses leading to axle spring chambers 38, supply and service air lines 40 and electrical sensor and power supply lines 42.

There are also some other apertures 44 in these side members 16, which accommodate components (not shown) such as electrical junction and fuse boxes, warning lights, etc. also used in some skid control systems.

The bottom surface of the housing frame 12 is designed as a single plane rectangular bolting rim or flange 45, containing a system of holes 47 with captive (slip-on-type) nuts.

Bolted to flange 45 are:

1. Flat plate type (mounting brackets 46 for attachment of computers 48;

2. A protective cover 50, which completes the package enclosure.

Figure 2:
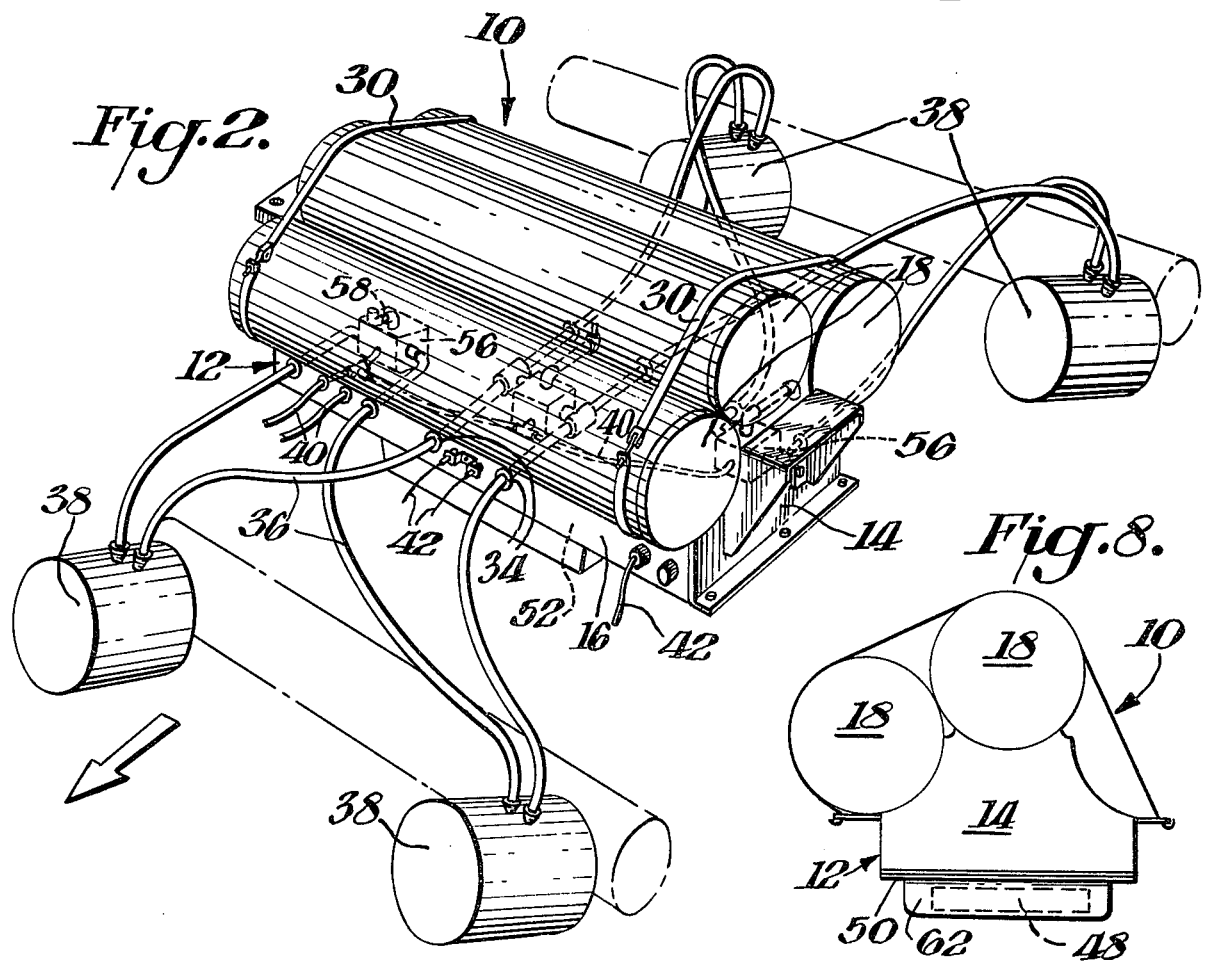
FIG. 2 is a three-dimensional view of the embodiment shown in FIG. 1.

As shown in FIGS. 1 and 2 with the above mentioned components in place, a space 52 of substantially trapezoidal cross-section is available inside the package 10, formed by the air reservoirs 18 on the top, the housing sides 16 and the computers 48 and protective cover 50 on the bottom.

The space 52 is ideally suited to accommodate the pneumatic and electro-pneumatic components 56 (valves) of the system, both as regards size and configuration. As shown in FIGS. 2 and 7, these components 56 (valves) are mounted by appropriately selected std. piping hardware 58 (couplings, elbows, nipples, etc.) to the air reservoirs 18 such assemblies being completed prior to mounting the reservoirs 18 onto the housing frame 12 to eliminate problems of limited tool and hand access.

The location and orientation of the valves 56 mounted to each reservoir 18 makes them "mesh", "nest" or "dovetail" with those mounted on the others; it also provides the necessary room between them to install connecting airlines and, finally, it places the discharge parts of the control and the amplifying relay valves in a very favorable position for leading the discharge air hoses out of package 10 (through grommeted housing openings 34) in the straightest and most direct way to the axle mounted spring brake chambers 38. This is an important functional requirement for the correct performance of the skid control system.

The electronic components, computers 48, are mounted below the plane of the bottom surface of the housing frame 12. The belly recess as indentation 62 in the protective cover 50 is provided to accommodate the vertical downward projection of the computers 48. There are three reasons for this recessed cover design and for the cover/housing interface being located above the computer level and close to the air reservoirs:

1. With cover removed, this provides complete access to the computers from bottom and sides for connecting, disconnecting, trouble shooting, etc.

2. With computer attachment fasteners 64 removed, computers fold down and hang by their connecting cables, thus providing full access to the valves above but still remaining electrically connected into the system (if so required for trouble shooting purposes).

3. Finally, and most importantly, this design approach makes it possible to remove the complete package 10 without any dissassembly other than removing its attachment bolts to trailer 66 (or chassis frame) and uncoupling the external air and electrical connections mentioned earlier.

The largest and most favorably located opening for removal of the package 10 exists between the forward axle and the (usually tubular) crossbrace connecting the equalizer beam brackets (not shown). However, even this opening is not wide enough (in the side elevation view) for the smallest dimension (height) of the package to pass through it. The points of interference are the two slack adjusters and their bearing plates 61 (FIG. 1), which project into the access opening. However, the lateral spread between these axle components is such; that a local projecton (in this case the "belly" of the package cover) will pass through them. In other words, if a "nesting" concept between the lateral clearance profiles of the axle and the package is used, generous clearances are available for the removal and reinstallation.

It is also important to note, that whereas the pneumatic and electro-pneumatic components of several of the skid control systems are similar in size and in basic design, the electronic computers or "logic modules" show wide variation range of sizes, configurations, mounting provisions etc. This makes it possible to design the package housing to accommodate interchangeably the valves of several skid control systems, and to have several variants of computer mounting brackets and protective covers, as dictated by the widely varying designs of the computers. As the housing frame 12 is the most basic largest and most expensive component of the package, making it a universally useable standard part, produced in large quantities by most economical manufacturing methods (sheet metal punching and forming) is the logical optimum manufacturing procedure.

Figure 8:
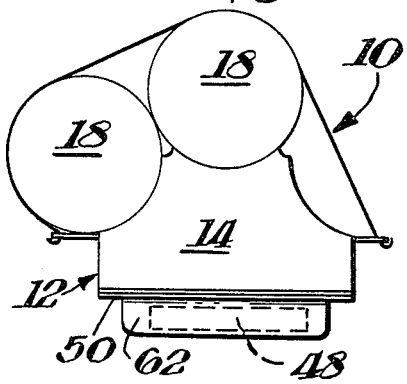
FIG. 8 is an end view of a modification of the embodiment shown in FIGS. 1-7 with only two air tanks instead of three.

The basic similarity between air valves of several skid control systems also permits the standardization of the three air tanks as regarding their ferrule size and location. These three tanks (or two as shown in FIG. 8 for the single axle system) can be then used in all these control systems without any modifications.

We claim:

1. A structural assembly for mounting anti-skid braking equipment including compressed air tanks with attached pneumatic controls and electrical controls on a wheeled vehicle comprising an elongated housing frame having short ends, relatively long sides and a pair of open rims, projections on the frame for securing it to the vehicle, tank receiving surfaces on the ends of the frame, the air tanks being disposed over one rim of the frame engaged with the tank receiving surfaces and disposed parallel to the sides of the frame, attaching means securing the tanks to the frame with the attached pneumatic control elements being disposed within the housing, the electrical control elements being disposed within the housing, a cover panel being disposed upon the other rim of the housing for covering it, and fastening means securing the cover panel to the housing.

2. A structural assembly as set forth in claim 1 wherein, the cover panel has an indented compartment within it, and electrical components being mounted on the housing in a position which disposes them within the indented compartment in the cover panel.

3. A structural assembly as set forth in claim 2 wherein, the electrical components have indexing tabs for connecting them on the housing in predetermined positions and the cover panel having recesses for receiving the indexing tabs.

4. A structural assembly as set forth in claim 3 wherein, drain openings are provided in the housing whereby water may be drained from the pneumatic controls without opening the housing.

5. A structural assembly as set forth in claim 1 wherein, the tank-receiving surfaces are disposed on opposite ends of the housing and the attaching means comprising straps having ends engaging the housing and binding the air tank to it.

6. A structural assembly as set forth in claim 5 wherein, the ends are comprised of ridged end sections having one upper and two corner indentations for receiving the sides of the air tanks therewithin.

7. A structural assembly as set forth in claim 6 wherein, the indentations are concave.

8. A structural assembly as set forth in claim 6 wherein, the sides have outwardly directed upper flanges for retaining the ends of the straps and inwardly directing the lower flanges for engagement by the cover panel.

9. A structural assembly as set forth in claim 8 wherein, the end sections have lower flanges for engagement by the cover panel.

10. A structural assembly as set forth in claim 9 wherein, mounting brackets are attached to the upper portions of the end section for mounting the assembly under the vehicle.

11. A structural assembly as set forth in claim 1 wherein, the pneumatic controls are staggered along the sides of the air tanks for nesting them together within the housing.

12. A structural assembly as set forth in claim 1 wherein, the frame has a top rim and a bottom rim and the air tank-receiving surfaces are disposed on the top rim of the frame and the cover panel is attached to the bottom rim of the frame.

* * * * *